United States Patent
Meadow

(10) Patent No.: US 10,489,716 B2
(45) Date of Patent: Nov. 26, 2019

(54) METHOD FOR PERFORMING AUTOMATED ANALYSIS OF SENSOR DATA TIME SERIES

(71) Applicant: Curtis Meadow, Newport, ME (US)

(72) Inventor: Curtis Meadow, Newport, ME (US)

(73) Assignee: Intellergy, Inc., Penobscot, ME (US)

(*) Notice: Subject to any disclaimer, the term of this patent is extended or adjusted under 35 U.S.C. 154(b) by 810 days.

(21) Appl. No.: 15/206,165

(22) Filed: Jul. 8, 2016

(65) Prior Publication Data
US 2018/0012132 A1   Jan. 11, 2018

(51) Int. Cl.
*G06F 15/18* (2006.01)
*G06N 7/00* (2006.01)

(52) U.S. Cl.
CPC .................. *G06N 7/005* (2013.01)

(58) Field of Classification Search
CPC .................................................. G06F 16/285
USPC ...................................................... 706/15, 45
See application file for complete search history.

(56) References Cited

U.S. PATENT DOCUMENTS

| | | | |
|---|---|---|---|
| 10,410,135 B2* | 9/2019 | Shumpert | G06F 11/008 |
| 2013/0096835 A1* | 4/2013 | Chok | E21B 47/12 |
| | | | 702/12 |
| 2016/0342903 A1* | 11/2016 | Shumpert | G06F 11/079 |

* cited by examiner

*Primary Examiner* — David R Vincent
(74) *Attorney, Agent, or Firm* — Anthony D. Pellegrini

(57) ABSTRACT

A method using a fast algorithm automated analysis of time series sensor data that can find an optimal clustering value k for k-means analysis by using statistical analysis of the results of clustering for a stated maximal upper value of k.

12 Claims, 5 Drawing Sheets

|   | 0 | 1 | 2 | 3 | 4 | 5 | 6 |
|---|---|---|---|---|---|---|---|
| 0 | 0.00% | 99.14% | 0.51% | 0.17% | 0.17% | 0.00% | 0.00% |
| 1 | 46.37% | 0.00% | 51.96% | 0.00% | 0.59% | 0.98% | 0.10% |
| 2 | 14.93% | 59.13% | 0.00% | 15.99% | 3.77% | 4.22% | 1.96% |
| 3 | 2.33% | 8.53% | 69.77% | 0.00% | 1.55% | 4.65% | 13.18% |
| 4 | 8.22% | 20.55% | 24.66% | 2.74% | 0.00% | 13.70% | 30.14% |
| 5 | 2.74% | 23.29% | 12.33% | 8.22% | 12.23% | 0.00% | 41.19% |
| 6 | 0.00% | 10.13% | 15.19% | 17.72% | 32.91% | 24.05% | 0.00% |

Figure 2

| State | Mean Watts | Mean Duration | Transition Down | Transition Up |
|---|---|---|---|---|
| 0 | 0 | 9.82 | 0.0% | 100.0% |
| 1 | 4 | 14.18 | 46.4% | 53.6% |
| 2 | 84 | 29.36 | 74.1% | 25.9% |
| 3 | 111 | 21.19 | 80.6% | 19.4% |
| 4 | 242 | 1.01 | 56.2% | 43.8% |
| 5 | 317 | 1.68 | 58.8% | 41.2% |
| 6 | 397 | 10.73 | 100.0% | 0.0% |

Figure 3

Data Confidence Interval Chart
Showing Selection of Filtered States

| Profile State | Filtered State | Condition | Watts | 98% Confidence Interval Low (Watts) | High (Watts) |
|---|---|---|---|---|---|
| 0 | F0 | Compressor off | 0 | 0.0 | 0.0 |
| 1 | F1 | Compressor off, Door open | 4 | 1.0 | 14.9 |
| 2 | F2 | Compressor on | 84 | 60.9 | 102.4 |
| 3 | F3 | Compressor on | 111 | 102.4 | 127.0 |
| 4 | | [Rejected] | 242 | 213.9 | 269.6 |
| 5 | | [Rejected] | 317 | 278.6 | 354.9 |
| 6 | F4 | Compressor on, Defrost cycle | 397 | 397.3 | 414.7 |

Figure 4

METHOD FOR PERFORMING AUTOMATED ANALYSIS OF SENSOR DATA TIME SERIES

CROSS REFERENCE TO RELATED APPLICATION

This application claims the benefit of provisional application, U.S. Ser. No. 62/190,317, filed Jul. 9, 2015, entitled METHOD FOR PERFORMING AUTOMATED ANALYSIS OF SENSOR DATA TIME SERIES, by Curtis Meadow, which is hereby incorporated by reference.

BACKGROUND OF THE INVENTION

1. Technical Field

The present invention relates to a method comprising, in one embodiment, an ultra-fast software-based algorithm operating on high volumes of real time data to find patterns that may indicate improper equipment activity. It can be used for other purposes including, but not limited to, monitoring of time spent in a running state in order to indicate when maintenance is due; analyzing operating efficiency over time; and finding ways to operate equipment more efficiently.

2. Description of Prior Art

Data is gathered in real time with regard to the operation of a piece of equipment, such as a refrigeration unit. The data can be any meaningful metric corresponding to the proper activity of the equipment, for example, electricity usage during each predetermined time period. Over time, a large amount of data is gathered corresponding to the equipment's activities, and the data is stored in an electronic database accessible by a computer. Patterns emerge from the data. By analyzing the data using computer software and comparing the patterns against known norms, the activity of the equipment can be determined to be within proper usage metrics or outside of those metrics, thereby requiring attention. Such pattern recognition over large volumes of data, however, is very costly in terms of necessary computer resources, and is thus impractical for widespread use.

There is thus demonstrated the need for a method for analyzing large volumes of data for determining optimum activity for equipment use.

It is thus an object of the present invention to present a method for analyzing large volumes of data for determining optimum activity for equipment use.

It is a further object of the present invention to present a method that analyzes large volumes of data by incorporating k-means clustering.

It is yet a further object of the present invention to present a method that finds an optimal clustering that corresponds to operating states of the equipment.

It is yet a further object of the present invention to present a method that uses centroids from an initial, expensive clustering as proxies for data points.

It is yet a further object of the present invention to present a method that can be processed in a fraction of the time required to prepare the initial clustering.

Other objects of the present invention will be readily apparent from the description that follows.

SUMMARY OF THE INVENTION

The present invention overcomes the difficulty of analyzing large volumes of data by incorporating k-means clustering and finding an optimal clustering that corresponds to operating states of the equipment. Raw data is initially clustered using a standard, computationally-intensive algorithm and then the resulting clusters are used as proxies for the actual data points in finding a global optimal solution. K-means clustering is an NP-hard problem, meaning that it cannot be solved except by applying the brute force approach of trying every possible clustering for the number of clusters K. Heuristic algorithms such as Lloyd's Algorithm and k-means++ work well but they are nevertheless computationally expensive. There is considerable disagreement as to the upper complexity bound of heuristic k-means algorithms but there is general agreement that it is super-polynomial. Given the likely presence of exponential terms, it is clear there is an enormous difference in running time for values of n between around n of 50,000 and around n of 100. Regardless of the optimality metric used, any algorithm to find an optimal clustering with K or fewer clusters for a set of n elements, for example, requires K−1 times the computational time required to create the initial clustering. If n is large, this is very expensive. However, by using the centroids from an initial, expensive clustering as proxies for the data points, an approximation of an optimal clustering can be determined that may be processed in a fraction of the time of the initial clustering. This is because the problem size is reduced by several orders of magnitude.

The algorithms used assume that centroids are standard normal distributions, and known facts about the number of data points and the variance within each cluster are used to achieve the reclustering. The usage can be extended to clusters with other probability distribution types provided that the distribution type has certain statistical properties.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims incorporated herein.

DESCRIPTION OF THE DRAWINGS

FIG. 2 is a table showing a transition probability matrix for a household refrigerator with an LED light bulb. Seven states are identified in the optimal clustering.

FIG. 3 is a table showing how the transition probability matrix shown in FIG. 2 is used to filter out transitional states.

FIG. 4 is a table showing the operating states of the refrigerator used in FIGS. 2 and 3 as identified by the operating state analysis, including 98% confidence intervals for each state.

DESCRIPTION OF THE PREFERRED EMBODIMENTS OF THE INVENTION

Figure 1:
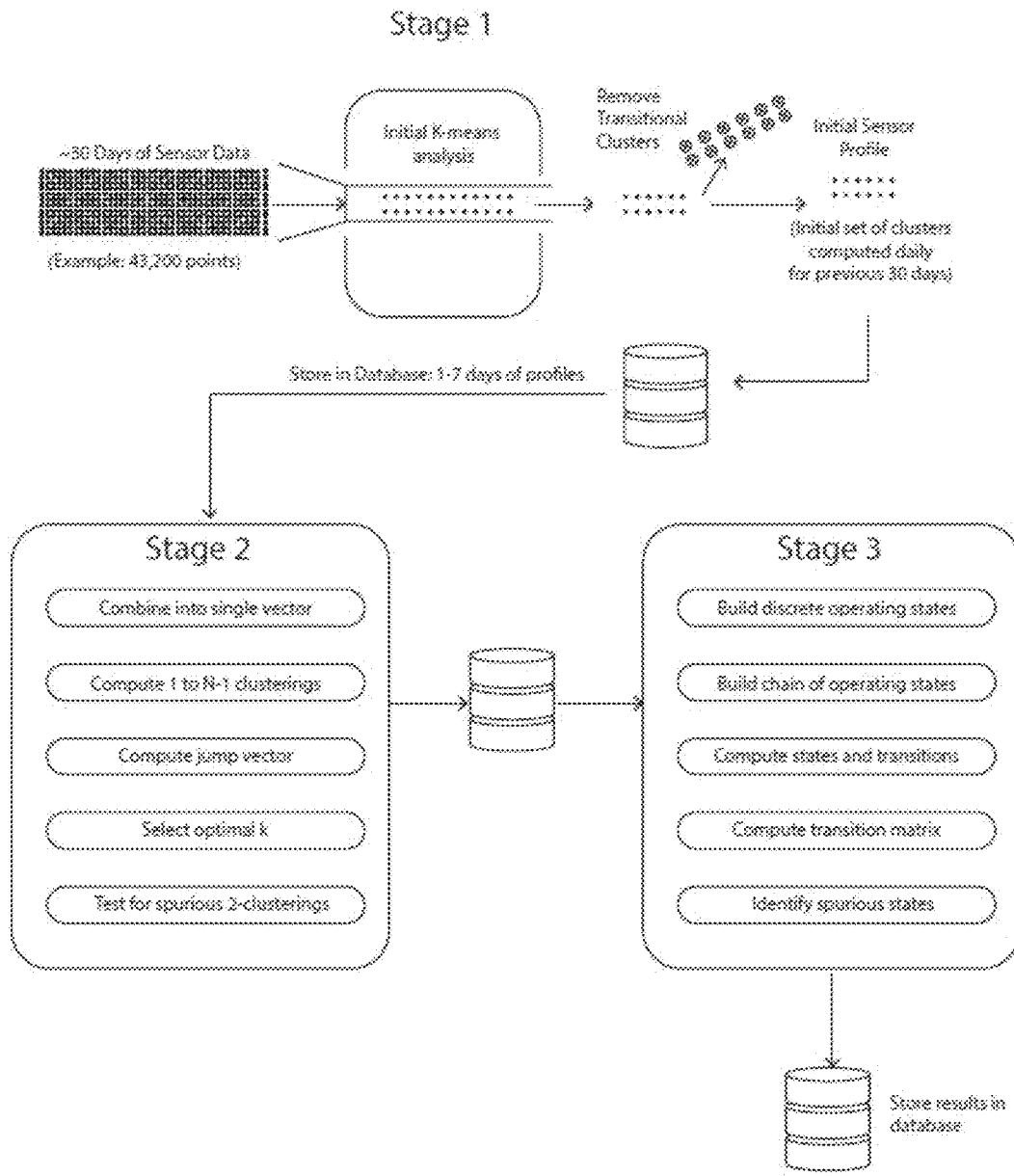
FIG. 1 is a flow chart showing the method steps of one embodiment of the invention.

The present invention uses a fast algorithm for automated analysis of time series sensor data.

The algorithm was developed for electric circuit analysis but can easily be extended to other types of sensor data, including flow meters, temperature and weather data, air quality sensors, and so on.

In k-means clustering given a set of n data points in a d-dimensional space, the problem is to find a cluster of k points, called centroids, that minimize the mean squared distance from each data point to its nearest centroid. In practical terms, the problem is to determine clusters of observations that represent normal equipment operating states.

To analyze sensor data in terms of operating states one first needs to establish the optimal value for k; in other words, one needs to know how many operating states there are. In an arbitrary vector of sensor data the optimal number is unknown. Several heuristic optimality algorithms are known. One such method for establishing the optimal value of k is known as the "jump method" [See Sugar, C A and James, G H, "Finding the Number of Clusters in a Dataset: An Information-Theoretic Approach", *Journal of the American Statistical Association*, Vol. 98, No. 463 (September 2003).]

Each possible k-means clustering from 1 to N (where N is the maximum value of k) has to be computed before a heuristic optimality test can be applied. K-means clustering is computationally very expensive, as described above. The present invention utilizes a fast algorithm that can find an optimal clustering value k using statistical analysis of the results of clustering for a stated maximal upper bound of k. This analysis has been applied tractably to data sets as large as 120,000 observations. Given an optimal clustering, each centroid is treated as the mean value of an operating state. Thus valid confidence intervals are defined for upper and lower bounds of each state. A time series can then be analyzed for normal operation and means and confidence intervals for operating state duration can be derived, as well as transition matrices or Markov chains for operating state transitions.

For example, given a sensor that reports data each minute, over the course of one day 1440 data points are obtained, and over the course of 30 days, 43,200 points are obtained. By using the centroids from an initial clustering of the raw data into 12 clusters, the data set can be reduced to 12 points. There is clearly a risk that if the initial clustering is not very good (a risk of heuristic algorithms) then computing an optimal reclustering using the centroids may not be much better. For that reason a series of clusterings over time are used as inputs to a second stage calculation. One week of relatively expensive 30-day clusterings (computed daily) yields a maximum of 84 data points for k=12 in the daily clusterings.

This results in a highly effective body of data for determining incidence of abnormal operation. Abnormal operation for electrical equipment can occur when 1) operating wattage is outside the confidence intervals of all operating states, 2) there is a transition from state A to state B that does not occur during normal operation, 3) there is a chain of transitions with probability close to 0; or 4) duration of the state lies outside confidence intervals. For particular types of equipment, operating state analysis can be refined to deduce other information about the equipment, such as defrost cycles and compressor duty cycles for refrigerators. If the equipment type is known, then other patterns indicating abnormal operation can be detected. For example, it is possible to determine the number of daily defrost cycles in a refrigerator, or detect a problematic operating pattern called "short-cycling" in heating and cooling units.

The specifics of the algorithm and its implementation in the present invention are as follows:

The algorithm is based on certain known properties of the input dataset. In one embodiment it is designed for analysis of data reported by sensors attached to pieces of equipment, which could include data points describing electrical power consumption, temperatures, flow rates, and the like. An example of a type of equipment that produces data amenable to this clustering process is any type of refrigeration or cooling equipment. Electrical consumption and temperatures tend to follow predictable patterns. An example of a type of data that is not amenable to the clustering process is the determination of the number of clusters of galaxies in a set of astronomical data.

Properties of data sets that are amenable to the clustering algorithm are:

an optimal clustering must have a fairly small number of clusters (e.g., $n<12$ or $n<20$);

each cluster should represent a true Gaussian distribution, or some other distribution that meets certain statistical tests; and data sets are repeated over time to yield a set of clusterings that can improve over time.

The algorithm as implemented relies on two other algorithms:

a standard k-means clustering algorithm; and the Sugar and James "jump method" of determining an optimal clustering.

One of the issues in establishing optimality is that there is no objective measure of optimality. Such measures depend on the goal(s) of the cluster analysis. In the present case a goal is to minimize the variability within clusters (a fairly common goal) but also to minimize the number of clusters identified and avoid clusters with indistinct boundaries.

The jump method is used because it is an information theoretic approach based on rate distortion theory. The jump method selects a clustering that minimizes the distortion of the clustering. Rate distortion theory is widely applied in lossy compression algorithms such as jpeg compression. The k-means algorithm used here is also a form of lossy compression: cluster means are used as proxies for the points contained in the cluster.

Example of the Algorithm Applied to a Refrigeration Unit:

The algorithm has three stages. The input to the first stage is a set of one-minute interval sensor readings representing 30 days of minute data (43,200 points if fully populated). A simple, non-optimized clustering of this data is performed and the results are stored in a database. The second stage takes a set of clusterings over time from Stage 1 and computes an optimal clustering of this data.

Stage 1.

Input: a vector v of one-minute sensor readings representing 30 days of minute data (43,200 points if fully populated). Output: a (likely) non-optimal clustering which is stored in a database with the mean, standard deviation, and number of cluster members.

1. Perform an initial cluster analysis on the raw data, requesting a maximum of N clusters for some N which should be larger than the expected optimal value of k. In one example N=12. Given the nature of the problem domain it is conceivable that N could be as high as 20 or 25, depending on equipment type.

A global optimization prior to the application of the k-means algorithm is the removal of zero values, provided that 0 represents an "off" state for the equipment. While not essential to the process, it does provide an often significant empirical reduction in problem size. Whether it can be employed depends on the type of data being clustered; for example, it is appropriate for electrical data, but not for temperature data.

If a series of previous clusterings is available, initial cluster seeds are chosen from the means of centroids of a set of previous clusterings; otherwise, the kmeans++ algorithm is used to create non-random seeds for a "new" set of points.

2. Using the data from the initial analysis, compute descriptive statistics about the clusters: mean, standard deviation, and the number of members in each cluster.

If appropriate for the data type, small clusters containing only two or three data points are rejected at this time. Because sensor data (other than flows) is averaged from 1-second data over a period of one minute, some values may represent an intermediate state that is not a true operating state for the piece of equipment. For example, if a 2000 watt motor is switched on halfway through the minute, the value reported will be 1000 watts. Over a period of time, there will be several intermediate values that will tend to form distinct clusters but do not represent true operating states.

The reason for starting with a value for k that is higher than the expected optimal value is that clusters representing transitional states can be found and rejected.

Stage 2.

Compute optimal clustering. Input: a set of clusterings over a period of time, for example, for one week. Output: a single clustering that represents a set of operating states for the equipment. The single clustering will have discrete boundaries given by confidence intervals.

The initial clustering is computationally intensive because of the large number of points. To achieve optimal clustering, clusters that represent true operating states are identified, in human terms, so that the behavior of the equipment can be analyzed.

The clusters derived from the initial clustering are now treated as if they were the data points, and the cluster means is used to arrive at an "optimal" clustering. The problem size has been reduced from thousands of data points to some number that is 100 or lower. While the k-means algorithm is computationally expensive for large data sets, the problem has been reduced so far that it is now easy and fast to compute trial clusterings with k from 1 to N−1.

Using the cluster means as a proxy for the values that they represent is a form of lossy compression. It can work only if the clusters are true Gaussian distributions, something that can be empirically tested and verified. In theory it can also work with other types of distributions provided that valid confidence intervals can be established.

In general, as the number of clusters for a data set increases, the mean error associated with the clustering should decrease, and when the number of clusters equals the number of points the error is 0. Because one dimensional data sets are used, the mean squared error (MSE) of the cluster is used as the estimate of distortion for the jump function. To help ensure that the computed clusters are good proxies for the true values the MSE is computed at each step from 1 to N−1 and tested to ensure that it forms a monotonically decreasing sequence. If an increase in MSE is encountered the input clusters are rejected as invalid and an error is reported.

Steps of Stage 2:

1. Build a vector of input values from the input cluster means. If any cluster means match, treat them as a single value but compute the pooled standard deviation because they are really distributions and not single values.

2. Compute all possible clusterings with k ranging from 1 to N−1, and for each clustering compute the distortion function as defined by Sugar and James.

3. Select as the optimal value of k the clustering that produced the largest difference in the distortion function.

4. Test for spurious optimal clusterings with two clusters and pick the second best if this is the case. Spurious optimal clusterings are tested using the coefficient of variability.

5. Store the optimal clustering in the database together with means, standard deviations, number of members, and pre-computed confidence interval values.

Step 4, above, was determined by empirical observation. Because the inputs to the Stage 2 algorithm cluster means that some information is "lost" that was contained in the very large data set represented by a week of minute data, it is to be expected that the selection of k sometimes may be inaccurate.

Stage 3.

Stage 3 uses the results of Stage 2 to analyze the operating states of the equipment.

The inputs to Stage 3 are a date-appropriate optimal clustering from Stage 2, and a vector of sensor readings over time. The output is a set of discrete operating states, characterized by mean value, standard deviation, number of occurrences over time, and a transition matrix that gives the probability of changing to state $S2$, given any state $S1$.

The clustering is tested for overlapping confidence intervals, collapsing or merging clusters if necessary, and compute the pooled standard deviations, yielding a single clustering that represents a set of operating states for the equipment, said clustering having discrete boundaries given by confidence intervals.

An example of clusters that may have overlapping confidence intervals can be seen in a simple household refrigerator, because compressors in normal operation consume the most power immediately after they are turned on, and the power consumption then gradually declines over the duration of the compression cycle. Therefore it is quite likely that the highest and lowest values of the compression cycle may form distinct clusters but it may be difficult or impossible to find a discrete boundary between them.

Using the series of sensor measurements, each measurement is tested to determine which operating state it represents, corresponding to clusters 0 through k, building a chain of operating states over time by recording the start time, end time, and duration of each state exhibited by the operating equipment.

Traversing the chain of operating states yields a set of state transitions that are aggregated into a matrix.

The transition matrix gives the probability of changing to state $S2$, given any state $S1$.

Using the transition matrix and criteria based on the state duration and the transition probabilities, states with low duration and relatively equal transition probabilities indicate a transitional or spurious operating states caused by anomalies of the measurement sensor or known properties of the equipment. Such states are filtered or removed FIG. 1 shows a flow chart showing the method steps described herein.

Following is an example of an application of the fast algorithm for automated analysis of the present invention:

The process in this example begins with an advanced statistical analysis of historic data, especially sensor data, from a refrigeration unit. The automated system performs an initial screening of broad sets of data derived by an initial analysis. It then iterates through screenings of those sets, comparing each for consistency, and reduces the number of sets to functional sets of data with high probabilities of accuracy. Applying the analysis to derivative statistical sets of progressively increasing accuracy, instead of to the raw data itself, greatly increases the speed of this. The core of the present invention is a unique method of creating and analyzing the sets into clusters useful for analysis and pattern discovery in equipment performance.

The following tables show examples of the clustering. The intention is to derive operating states of equipment from raw data. A simple refrigerator has four operating states:

1. Door closed, compressor not running, power consumption 0 (or perhaps a few watts for control circuitry);
2. Door open, power consumption 3 to 40 watts because the light is on;
3. A compressor cycle, which usually dwarfs the light bulb wattage (making it difficult to distinguish compressor running with the door open from compressor running with the door closed); and
4. A defrost cycle, with very high wattage.

Because the compression power is much greater than the light bulb power, it is not useful to consider "compressor on, bulb off" and "compressor on, bulb on" as separate operating states. FIG. 2 shows a transition probability matrix for a household refrigerator with an LED light bulb. Seven states were identified in the optimal clustering.

FIG. 3 shows how the transition probability matrix is used to filter out transitional states.

Any state that is transitional, that is, changing by amounts outside the parameters of the likely cluster amounts, is removed from consideration, increasing the probability of accuracy of the remaining states in this iteration of the data. As non-likely states are removed, actual equipment states are revealed. The more data history there is, the more accurate the analysis becomes. The shaded data is likely transitional, because it fits the rule "mean duration less than 2 minutes and probability of transitioning up or down roughly equal."

FIG. 4 shows the operating states as identified by the operating state analysis, including 98% confidence intervals for each state.

Figure 5:
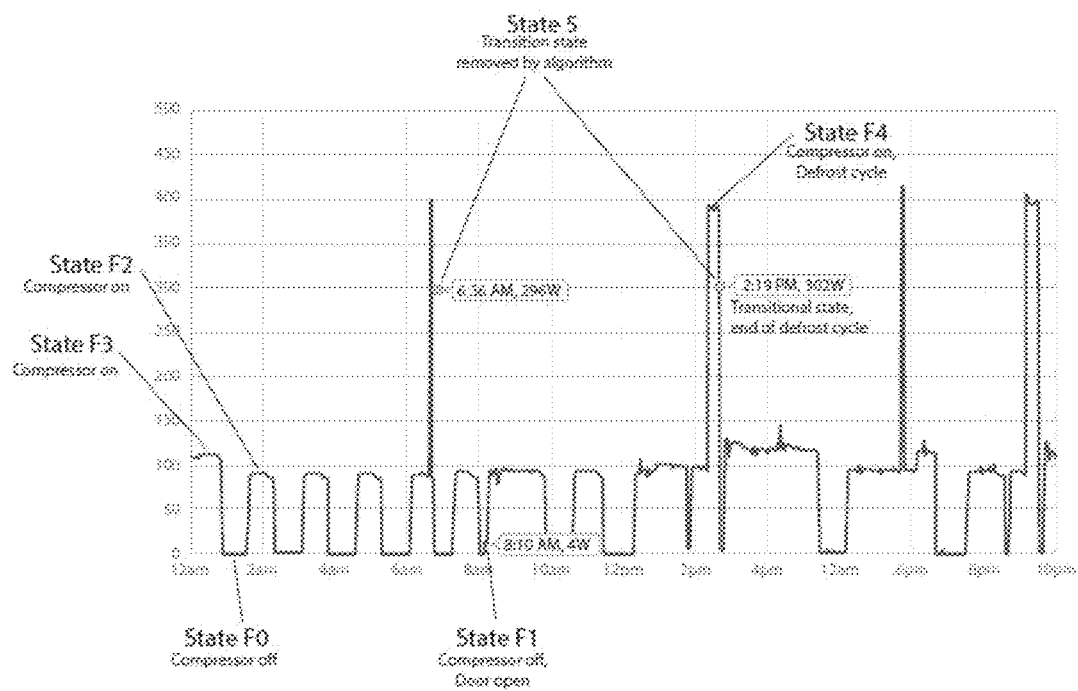
FIG. 5 is a graph showing one day of normal operation of the refrigerator used in FIGS. 2 through 4.

FIG. 5 shows one day of normal operation on this circuit. Some data points, not otherwise easily visible to the eye because there are 1440 points on this chart, are labeled. It can be seen that there is some noise likely introduced by other electrical devices on the circuit. The operating states identified as F2 and F3 are both compression states. Other analysis on refrigeration circuits identifies defrost cycles shortly after 2 pm and around 11 pm. The spikes around 6:30 am and 8 pm are likely some other device operating as the duration of 2-3 minutes falls outside the 99% confidence intervals established for identifying defrost cycles.

In the case of the refrigerator, patterns of electricity usage that represent operating states can be derived, and anomalies in the patterns can be discovered that would indicate equipment malfunction. FIG. 5 shows two defrost cycles in a 24 hour period. Had the spikes been longer in duration, 4 cycles would have been identified, generating a warning of "too many defrost cycles." An equipment profile database can be constructed in a mostly automated process by deducing optimal clustering from detailed data, and populating the database for that equipment. Building history allows more accurate clustering. Data might be gathered from actual equipment data or from "virtual" or recalculated data, such as coefficient of performance data for a heat pump or a boiler, which is calculated from electricity usage data plus a number of other factors.

Modifications and variations can be made to the disclosed embodiments of the present invention without departing from the subject or spirit of the invention as defined in the following claims.

I claim:

1. In a system comprising a piece of equipment with one or more sensors installed thereon, said one or more sensors capable of obtaining data relevant to the operation of said equipment and capable of forwarding said data to a computing device, said computing device capable of populating a database with said data and of performing calculations on data contained therein, a method comprising the following steps:

A1. Obtain multiple data points from the one or more sensors over regular intervals for a fixed period of time, whereby each data point is a value reported by said one or more sensors attached to said equipment;

A2. Store data points in said computer readable database;

A3. Perform an initial cluster analysis on the set of stored data points to obtain a maximum of N clusters for some N which is larger than an expected optimal number of clusters (designated "k");

A4. Reject false clusters containing only two members when such clusters are identifiable as an anomaly caused by the one or more sensors;

A5. Calculate cluster centroids (mean values) for each non-rejected cluster;

A6. Store non-rejected clusters and their corresponding centroids in said computer readable database;

B1. Build a vector of input values from each of the stored cluster centroids from the set of clusterings, whereby the input is a set of clustering obtained by repeating Steps A1-A4 one or more times;

B2. Compute all possible clusterings from 1 to N−1 using said vector of input values and for each said clustering compute a distortion function;

B3. Select as k the optimal clustering that produces the largest difference in the distortion function;

B4. Store the optimal clustering in the database together with means, standard deviations, number of members, and pre-computed confidence interval values;

C1. Take the clustering from Step B4 and test for overlapping confidence intervals and compute the pooled standard deviations, yielding a single clustering that represents a set of operating states for the equipment, said clustering having discrete boundaries given by confidence intervals;

C2. Using a series of sensor measurements over time, test each measurement to see which operating state it represents, corresponding to cluster 0 through k, building a chain of operating states over time;

C3. Traverse the chain of operating states to yield a set of state transitions as well as the count, mean, and standard deviation of the time spent in each state;

C4. Using the set of state transitions, construct a transition matrix that gives the probability of changing to state Y, given any state X;

C5. Apply an equipment specific set of criteria based on the state counts and/or duration and the transition probabilities whereby states with low duration and relatively equal transition probabilities indicate the removal of transitional or spurious operating states caused by anomalies of the measurement sensor or known properties of the equipment; and C6. Store the final set of operating states in a database table and use same to provide information to an end-user or to alert the end-user to conditions requiring human attention.

2. The method of claim 1 wherein Step A1 involves one sensor reading per minute.

3. The method of claim 1 wherein Step A3 involves performing the initial cluster analysis over a period of multiple days.

4. The method of claim 1 wherein Step A3 involves performing the initial cluster analysis over a period ranging from 5 days to 90 days.

5. The method of claim 1 wherein Step A3 involves choosing initial cluster seeds from a mean set of previous clusterings.

6. The method of claim 1 wherein Step A3 involves developing initial cluster seeds by applying a k-means++ algorithm.

7. The method of claim 1 wherein Step B1 further involves computing pooled variance when the centroids represent distributions rather than single observations.

8. The method of claim 1 wherein the distortion function computed in Step B2 is the distortion function defined by Sugar and James.

9. The method of claim 1 further comprising the following step:
   B3A. If the optimal clustering contains only two members, as determined using a threshold test of the coefficient of variability, reject said clustering and repeat Step B3,
   whereby Step B3A follows Step B3.

10. The method of claim 1 wherein clusters are collapsed in Step C1 if necessary.

11. In a system comprising a piece of equipment with one or more sensors installed thereon, said one or more sensors capable of obtaining data relevant to the operation of said equipment and capable of forwarding said data to a computing device, said computing device capable of populating a database with said data and of performing calculations on data contained therein, a method comprising the following steps:
   A1. Obtain multiple data points from the one or more sensors over regular intervals for a fixed period of time, whereby each data point is a value reported by said one or more sensors attached to said equipment, with one sensor reading per minute;
   A2. Store data points in said computer readable database;
   A3. Perform an initial cluster analysis on the set of stored data points over a period of multiple days ranging from 5 to 90 to obtain a maximum of N clusters for some N which is larger than an expected optimal number of clusters (designated "k"), whereby initial cluster seeds are chosen from the mean set of previous clusterings if such exist, or if previous clusterings do not exist the initial cluster seeds are developed by applying a k-means++ algorithm;
   A4. Reject false clusters containing only two members when such clusters are identifiable as an anomaly caused by the corresponding sensor;
   A5. Calculate cluster centroids (mean values) for each non-rejected cluster;
   A6. Store non-rejected clusters and their corresponding centroids in said computer readable database;
   B1. Build a vector of input values from each of the stored cluster centroids (mean values) from the set of clusterings, whereby the input is a set of clustering obtained by repeating Steps A1-A4 one or more times, computing pooled variance where necessary;
   B2. Compute all possible clusterings from 1 to N−1 using said vector of input values and for each said clustering compute a distortion function;
   B3. Select as k the optimal clustering that produces the largest difference in the distortion function;
   B4. If the optimal clustering contains only two members, as determined using a threshold test of the coefficient of variability, reject said clustering and repeat Step B3;
   B5. Store the optimal clustering in the database together with means, standard deviations, number of members, and pre-computed confidence interval values;
   C1. Take the clustering from Step B5 and test for overlapping confidence intervals, collapsing clusters if necessary, and compute the pooled standard deviations, yielding a single clustering that represents a set of operating states for the equipment, said clustering having discrete boundaries given by confidence intervals;
   C2. Using a series of sensor measurements over time, test each measurement to see which operating state it represents, corresponding to cluster 0 through k, building a chain of operating states over time;
   C3. Traverse the chain of operating states to yield a set of state transitions as well as the count, mean, and standard deviation of the time spent in each state;
   C4. Using the set of state transitions, construct a transition matrix that gives the probability of changing to state Y, given any state X;
   C5. Apply an equipment specific set of criteria based on the state counts and/or duration and the transition probabilities whereby states with low duration and relatively equal transition probabilities indicate the removal of transitional or spurious operating states caused by anomalies of the measurement sensor or known properties of the equipment; and
   C6. Store the final set of operating states in a database table and use same to provide information to an end-user or to alert the end-user to conditions requiring human attention.

12. In a system monitoring a number of pieces of equipment with one or more sensors installed thereon, with some of said pieces of equipment of a known type and other of said pieces of equipment of an unknown type, a method for performing operating state analysis to tentatively identify said equipment of unknown types, said method comprising the following steps:
   A1. Obtain multiple data points from the one or more sensors over regular intervals for a fixed period of time, whereby each data point is a value reported by said one or more sensors attached to said equipment;
   A2. Store data points in said computer readable database;
   A3. Perform an initial cluster analysis on the set of stored data points to obtain a maximum of N clusters for some N which is larger than an expected optimal number of clusters (designated "k");
   A4. Reject false clusters containing only two members when such clusters are identifiable as an anomaly caused by the one or more sensors;
   A5. Calculate cluster centroids (mean values) for each non-rejected cluster;
   A6. Store non-rejected clusters and their corresponding centroids in said computer readable database;
   B1. Build a vector of input values from each of the stored cluster centroids from the set of clusterings, whereby the input is a set of clustering obtained by repeating Steps A1-A4 one or more times;
   B2. Compute all possible clusterings from 1 to N−1 using said vector of input values and for each said clustering compute a distortion function;

B3. Select as k the optimal clustering that produces the largest difference in the distortion function;

B4. Store the optimal clustering in the database together with means, standard deviations, number of members, and pre-computed confidence interval values;

C1. Take the clustering from Step B4 and test for overlapping confidence intervals and compute the pooled standard deviations, yielding a single clustering that represents a set of operating states for the equipment, said clustering having discrete boundaries given by confidence intervals;

C2. Using a series of sensor measurements over time, test each measurement to see which operating state it represents, corresponding to cluster 0 through k, building a chain of operating states over time;

C3. Traverse the chain of operating states to yield a set of state transitions as well as the count, mean, and standard deviation of the time spent in each state;

C4. Using the set of state transitions, construct a transition matrix that gives the probability of changing to state Y, given any state X;

C5. Apply an equipment specific set of criteria based on the state counts and/or duration and the transition probabilities whereby states with low duration and relatively equal transition probabilities indicate the removal of transitional or spurious operating states caused by anomalies of the measurement sensor or known properties of the equipment;

C6. Store the final set of operating states in a database table;

D1. Use stored operating state analyses over a period of time for each piece of equipment, performing a four dimensional optimal cluster analysis on the operating state analyses of known equipment with similar sensors, using the following dimensions: number of operating states, mean duration of each operating state, relative amplitude of each operating state, and distance between the state transition matrices;

D2. Accept as valid types those clusters that have narrow confidence intervals in each dimension;

D3. Compute the Euclidean distance in four dimensions between the operating state analyses of the unknown piece of equipment and the accepted clusters of equipment types;

D4. If each dimension falls within the n % confidence intervals of each component of some cluster, then it can be accepted as belonging to that cluster;

D5. If some dimensions match and others do not, the overall clustering can be repeated and if nothing changes except the one cluster containing the unknown equipment and that cluster continues to have acceptably narrow confidence intervals, then it can be accepted as belonging to that cluster; and D6. Otherwise the unknown piece of equipment is rejected as a member of any known type.

* * * * *